United States Patent [19]

Fortin

[11] Patent Number: 4,463,638

[45] Date of Patent: Aug. 7, 1984

[54] BAND SAW

[76] Inventor: Roméo G. Fortin, 1409 Caribou St., Moose Jaw, Saskatchewan, Canada, S6H 7M4

[21] Appl. No.: 351,006

[22] Filed: Feb. 22, 1982

[51] Int. Cl.³ .............................................. B27B 13/14
[52] U.S. Cl. ....................................... 83/62.1; 83/818; 83/564
[58] Field of Search .................. 83/62, 62.1, 820, 788, 83/818, 564, 809, 810, 811, 61, 397

[56] References Cited

U.S. PATENT DOCUMENTS

| 170,814 | 12/1875 | Carey | 83/818 |
| 1,927,203 | 12/1932 | De Groot | 83/62.1 |
| 2,357,902 | 8/1942 | Malhiot | 83/397 |
| 2,434,174 | 1/1948 | Morgan | 83/62.1 |
| 2,664,118 | 12/1953 | Krumbach | 83/810 |
| 2,843,917 | 7/1958 | Crane et al. | 83/820 |
| 3,563,285 | 2/1971 | Tarasher | 83/818 |
| 4,364,294 | 12/1982 | Ellardt | 83/820 |

FOREIGN PATENT DOCUMENTS

| 109330 | 1/1899 | Fed. Rep. of Germany | 83/809 |
| 267708 | 9/1929 | Italy | 83/818 |

Primary Examiner—James M. Meister
Assistant Examiner—John L. Knoble

[57] ABSTRACT

An improved design for a band saw comprises a four wheeled blade guide with a pivotal spring-biased tensioning means and an emergency cut off switch that is actuated upon blade breakage.

A band saw comprising of pivot mounted frame as to achieve a parallel swinging motion. Said frame having affixed in a precise position a power isolating assembly. An improvement for compactness and relatively cheaper to manufacture.

1 Claim, 7 Drawing Figures

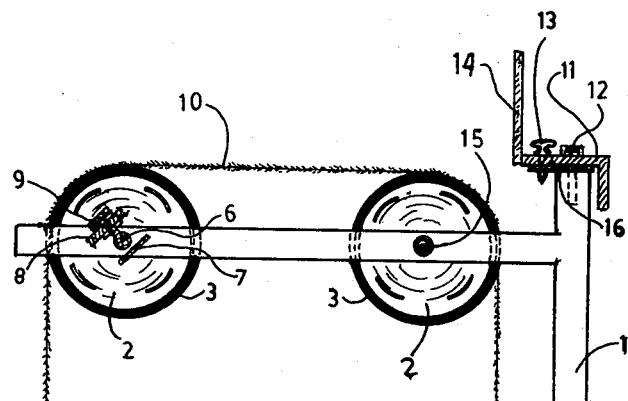
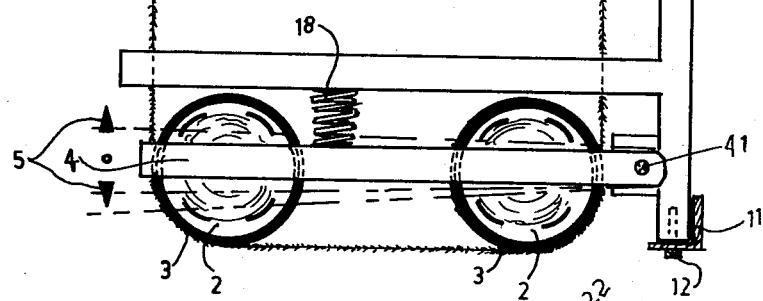
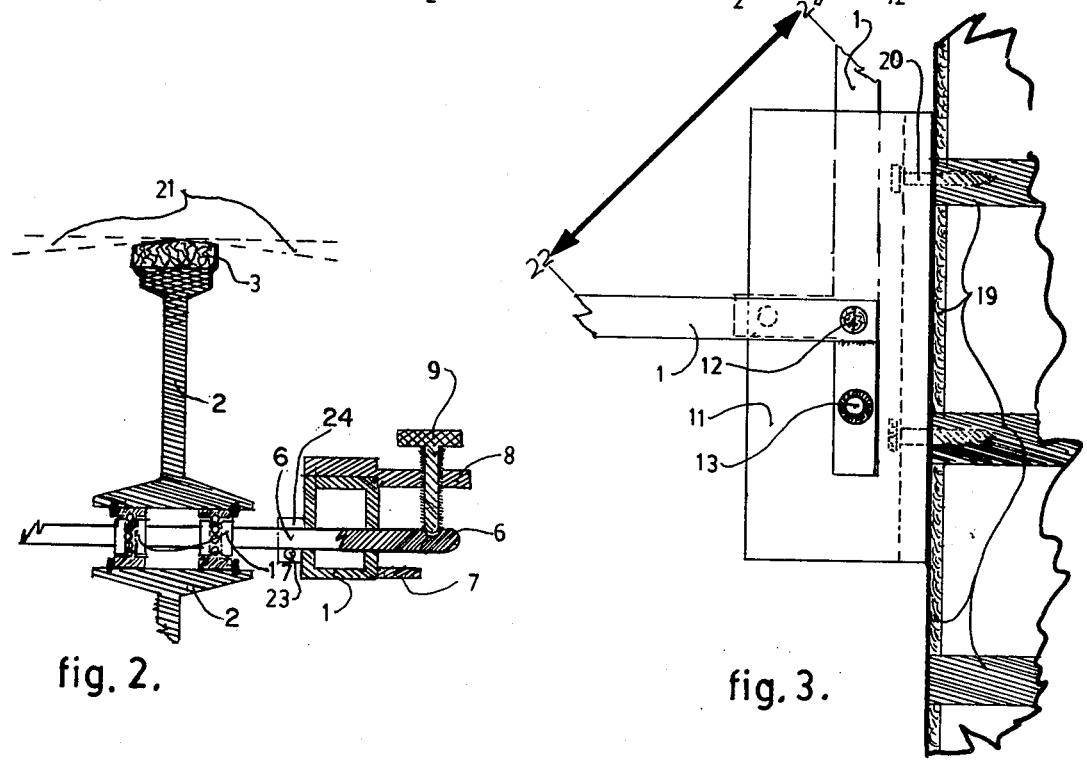
fig. 1.
fig. 2.
fig. 3.

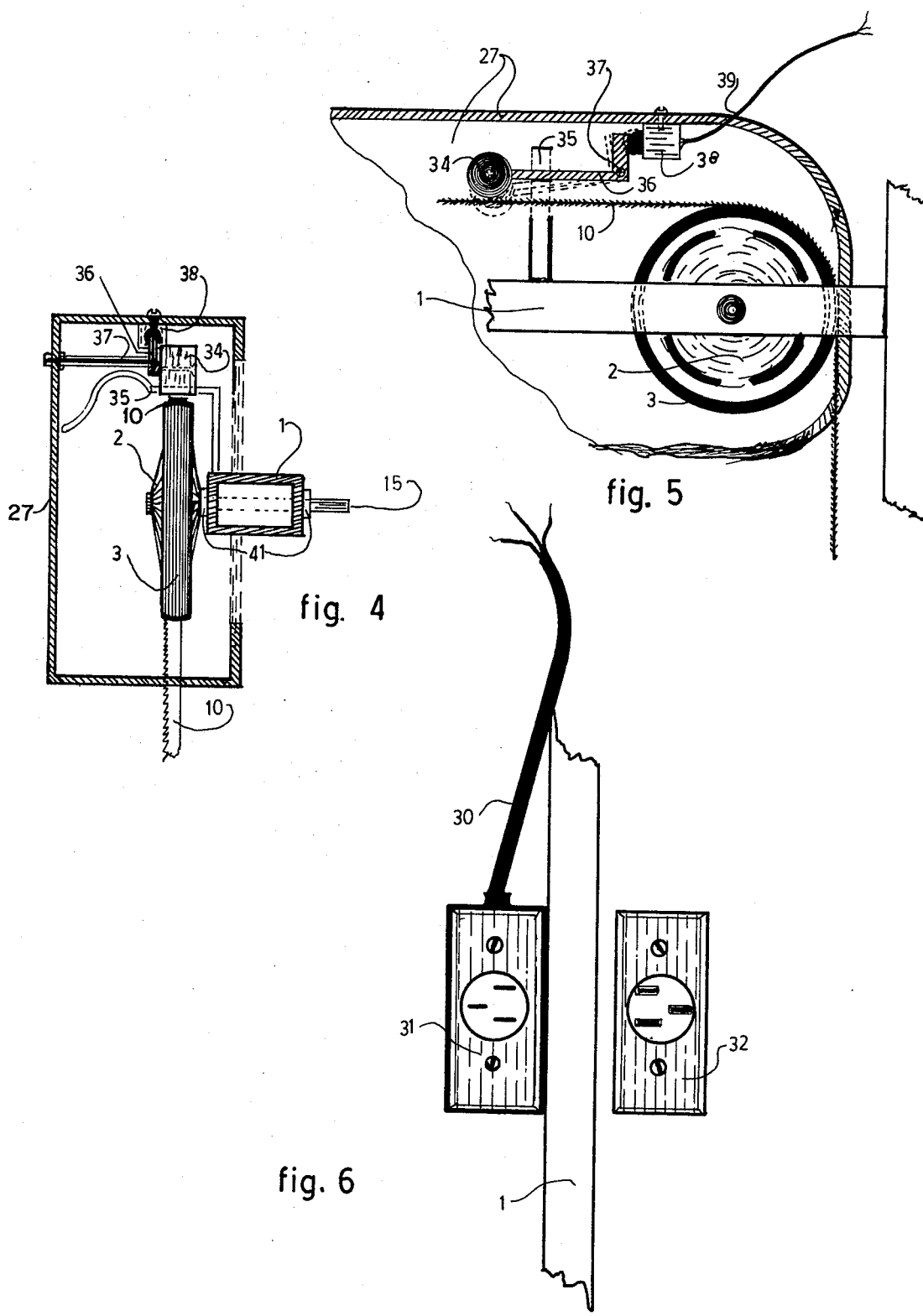

BAND SAW

BACKGROUND OF THE INVENTION

This application deals with cutting and more specifically, relates to band saws. It has long been known in the art to incorporate four wheels to form the glide or travel path of a band saw blade. An object of this invention is to remove the large, bulky wheels used for achieving height and depth on a band saw frame. Examples of prior art in this area are U.S. Pat. No. 170,814 to Carey and Italian Pat. No. 267,708 to Cacciamli. Both disclose band saws that use four wheels to guide the band saw blade.

A further object of this invention is to provide a spring biased blade tensioning mechanism for a band saw that has four glide wheels.

A still further object of this invention is to provide a simple emergency cutoff system to stop operation of a band saw when the blade is broken.

A still further object of this invention is to provide a power isolating switch when saw is in storage position.

SUMMARY OF THE INVENTION

The principal advantage of the present invention, having four wheels, is to eliminate the large bulky wheels used for achieving height and depth, depth being the distance between the blade and frame, height being the distance between the working surface area and the bottom portion of the guard.

Prior saws have 2-24" wheels on the large models to achieve a 22" width of cut. Being such a large wheel, it has to be constructed of heavy and warp free material. It also has to be perfectly balanced to achieve smooth operation and requires larger bearings. To turn all these heavy metal wheels leads to more power input. Normally, a band saw of this size will take a 2 to 5 HP electric motor, thus the overall height and weight of saw is needlessly large. To achieve a height of cut of 12", this type of saw needs two wheels of 24", which equals 48" plus the 12" height of the cut plus the guard and base stand. The overall height of the saw would be approximately 8' and it would weigh about 1000 lb.

It is another advantage of this invention to reduce height, weight, bulk, and power consumed. It can also be used as wall mounted or on a fixed or mobile stand that could incorporate brake loaded casters, thus making it more compact and lighter, yet achieving the same cutting depth or clearance.

Another advantage of this invention is the incorporation of a safety cut off switch, that is constructed and positioned on the band blade near the main drive wheel. It is the main function of this switch to cut off power to the electric motor, stopping the band saw immediately after the breakage of the band saw blade or derailment of the blade caused by material being cut. It sometimes has the tendency to seize on the flat surface of the band saw blade when achieving a circular cut on certain types of material or other related causes encountered when in operation, thus eliminating all dangerous elements such as back lashing of broken blades and entanglement of blade around the wheels. This switch mechanism is invaluable as it can be installed in any existing make or model of band saws.

BRIEF DESCRIPTION OF DRAWING

FIG. 1 shows the U-shaped frame, wheel position, saw blade travel path, sectional cross cut of mounting brackets, and hinges with locking mechanism, hinged to main frame supporting two lower idler wheels.

FIG. 2 is a cut off view of the left side top wheel situated on the top portion of the U-shaped frame of FIG. 1.

FIG. 3 is top view of upper portion of main frame showing operating and storage position of the band saw on wall mounted model.

FIG. 4 is a cut off view of the main drive wheel and safety cut off switch.

FIG. 5 is same side view as FIG. 1 showing detailed view of safety switch.

FIG. 6 shows the power supply outlets and receptic in a storage position.

DESCRIPTION OF THE PREFERRED EMBODIMENT

Figure 7:
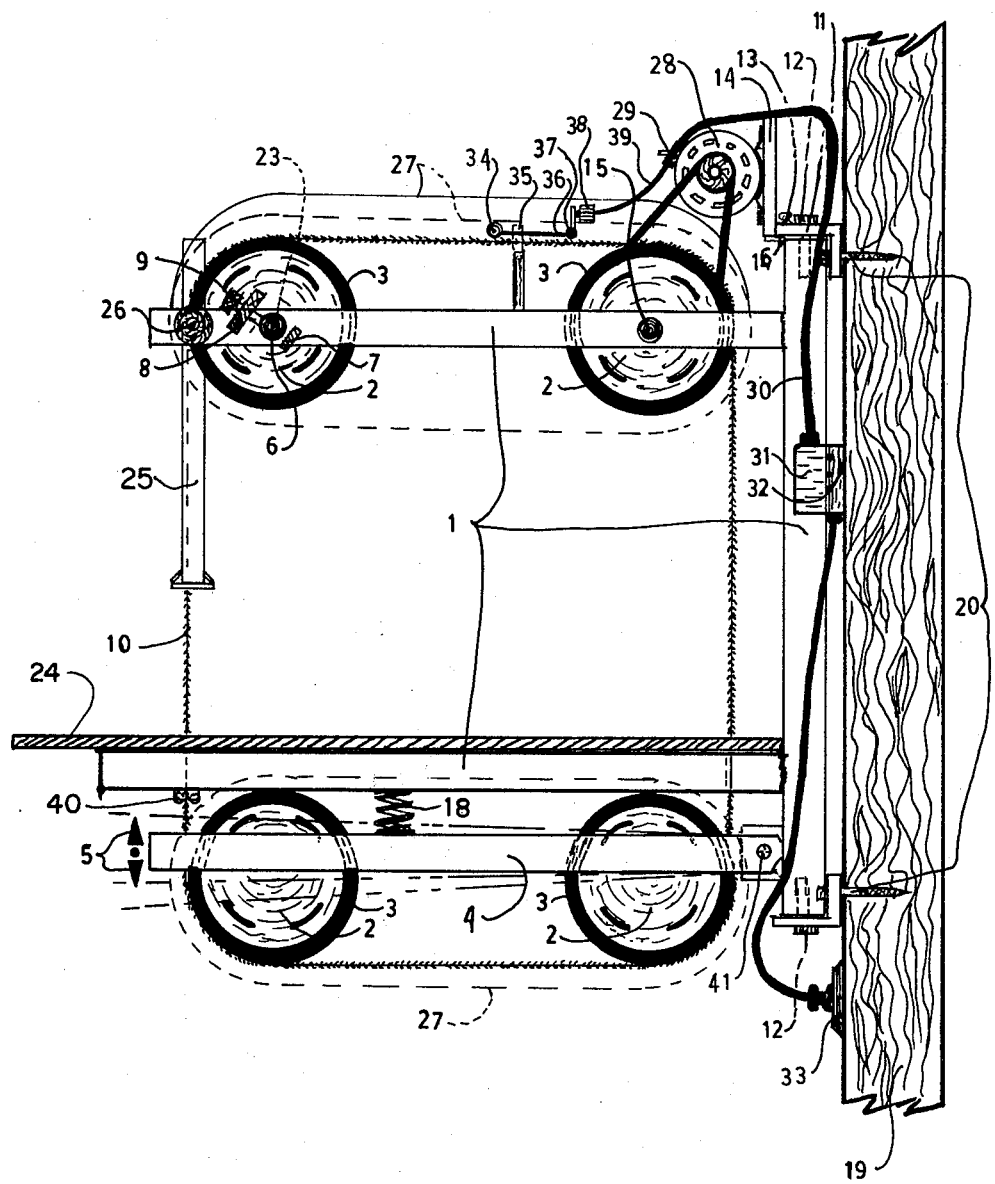
FIG. 7 is a side view of the invention in its entirety.

All parts and components are represented by a numeral character throughout all views found on drawings.

The main frame 1 is shaped into a U-shaped design to accommadate all of the saws moving and fixed parts and components.

The frame can be constructed or molded from almost any material capable of supporting strengths (preferably steel or aluminum).

On the present saw, I used a 50 mm. square steel tubing welded together to achieve a U-shaped frame. Supporting the frame on the wall mounted models is an angle iron 11, 75 mm. by 50 mm. by 6 mm. thick and 500 mm. long. The 50 mm. face side of the angle iron is fastened facing the wall by any strong fasteners, depending on the type of wall (concrete, wood, etc.).

As viewed on FIG. 3 on sheet 2 of 3, the upper bracket is located on the top of the vertical portion of the frame 1. The center of the angle iron has a hole drilled to accept a bolt or pin 12, to form and act as a hinge, allowing the frame 1 to swivel toward the wall in storage position.

A spring loaded pin 13 having a tapered end that will drop into a hole provided, at a precise location 50 as to hold the frame 1 in a 90 degree position from the wall is provided. Another hole is provided for the stored position as viewed on FIG. 3 of sheet 2 of 3.

The arrow 22 to 22 depicts the travel path of frame 1, when pin 13 is pulled up to disengage frame 1 from post 11.

Lag bolts 20 fasten post 11 to wall 19, which is a common wood and gyprock wall.

Referring to FIG. 1 on sheet 2 of 3, reference numeral 2 shows four wheels each having a diameter of 240 mm., comprised of three idlers and one drive wheel. The three idler wheels on the present saw are equipped with sealed ball type bearings and mounted on steel axles 6 which are welded to frame 1 at a spaced distance apart, as to form the width of throat depth pivot 15 secured to the drive wheel in a permanent of semipermanent fashion. Once axle 6 is fastened to the center of the wheel, two sealed ball bearings are machined to axle 6, and placed three to four inches apart as to form a support, and through this support the shaft can accommadate a V-belt pulley for 9 power drive delivered by the motor.

The housing 17, having bearings, is fastened to frame 1 by means of bolts, welding, or any other adequate fasteners. Steel wheels 2 are covered with a hard rubber surface 3. The wheels can be composed of lighter materials such as plastics and related teflons, aluminum, or a combination thereof.

The wheels are smaller than in the prior art, allowing them to be made cheaper and lighter.

A hard rubber coating 3 is molded or fastened to outer circumference by any suitable fashion.

Adjustment wheel 2 has to have a minimum of 3 degrees to 5 degrees maximum taper to form a high spot for band saw blade 10 to naturally climb to the center of the wheel, so it may remain at that precise area when in motion.

Using this principle, the present invention requires only one wheel adjustment for centering the band blade on all four wheels to maintain the blade in a central position. This serves to eliminate inaccurate movements on the vertical cutting area of blade as acquired on prior arts.

Axle 6 is a 15 mm. thick steel rod fitted to the wheel and bearings. Located 1 cm. from the wheel hub is a U-shaped bracket 24 that is welded to frame 1 and has a hole drilled through both sides of the bracket center. Taking a 2 cm. by 2 cm. by 1 cm. iron block 23, and welding said block to axle 6, 1 cm. from the wheel hub, and also drilling a hole in the center so that when inserting pin 23 between bracket 24 the wheel and axle may change their angle and pitch when a large headed bolt 9 fully threaded, is turned clockwise or counter-clockwise in its tapered hole 8, which is welded to frame 1.

The cut off portion of axle 6 shows the counter sinking at the end of axle 6 to accommodate bolt 9's rounded end to seat in and stay from slipping off axle 6.

Turning bolt 9 to its fullest clockwise will bring axle to rest against stop 6, 7, that is, simply to stop bar to regulate only the amount of angle on wheel 2 necessary. The present invention may incorporate many ways and different mechanical and material parts to achieve the movement of wheel 2.

A pivoted arm 4, best viewed in FIG. 1, consists of same material as frame 1 and achieves three functions:
 a. being the lower idler wheels support;
 b. adopting an adjustment free tension to blade 10 keeping blade 10 snug and taut by coil spring 18, installed between arms 1 and 4 in space provided;
 c. to support the lower guard.

Welded on one end of the pivoted arm are two flat iron pieces with their flat sides attached to both sides, and allowing one to form a clevis. One hole is drilled through both sides to accommodate hinge 41, to allow arm 4 free up and down vertical movement from frame 1.

In viewing FIG. 4 and 5, bar 35 is fashioned of round iron, and is formed by bending it into shape to correspond to the view of FIG. 4, then is fastened to frame 1 by means of welding. A medium to heavy piece of sheet iron is shaped to form a guard 27. Then a hinge is fastened to the portion of frame 1's upper vertical area, nearest to the wall mounts and the related end of guard 27 to allow guard 27 to open away from the saw assembly, on the opposite of the wall to reveal blade 10 and wheel 2 and all components of upper portion of the saw.

A pivoted link 36 has free pivotal motion about the hole drilled in the center of the bend in the L-shape. It is fastened to guard 27 by bolt 37, with bolt 37 accommadating a spacer pipe to stop pivoted link 36 from sliding back and forth on bolt 37. On the longest portion of pivotal link 36 is a small free idling rubber wheel 34, resting on blade 10.

Pivoted link 36 has to have a clearance in between bar 35 great enough to allow wheel 34 and the long portion of bar 35 to drop down, pivoting the short portion of bar 35 away from switch 38. Thus power is turned off the same way a car door turns a dome light on and off. This occurs only when saw blade 10 breaks or seizes on material work piece.

It is the object of bar 35 having a curved shaped end to draw wheel 34 up from blade 10 so as not to drag across blade 10, when wheel 36 and link 34 are following the curved area of bar 35. As wheel 36 and 34 near the lower part of bar 35, the switch turns off; isolating electrical power from motor when the guard is opened for inspection or replacement of blade 10. The band saw is thus rendered perfectly safe to inspect or replace or repair broken parts. When guard 27 is closed for operating, the electrical power source is then automatically reconnected.

It is noted that similar apparatus can be used to achieve the same results using different elements, materials, or altered formats.

I claim:
1. A wall-mounted bandsaw comprising:
 (a) a pair of vertically spaced supports adapted to be mounted to the face of said wall;
 (b) a vertically extending pin affixed to each of said supports;
 (c) a frame comprising a vertical member and two spaced apart horizontal members pivotally mounted about said pins for horizontal swinging movement such that the frame may be pivoted from an operative position at an approximate angle to the wall and to an inoperative position approximately parallel to the wall;
 (d) a pair of guide wheels mounted on one of said horizontal members;
 (e) an arm pivotally mounted about an axis on said vertical member.
 (f) a spring mounted between the other of said horizontal members and said arm in order to urge said arm about said axis;
 (g) a pair of guide wheels mounted on said arm;
 (h) an electric motor to rotationally drive one of said guide wheels;
 (i) an emergency power cut off switch mounted on said frame, said switch being activated by an assembly comprising an idler wheel mounted on a pivoted link, said idler wheel resting on the endless blade of said band saw, a pressure-controlled switching element abutting a second slide of the pivoted link, the aforementioned elements coacting upon the breakage of the endless blade so that said idler wheel drops under the force of gravity, causing said pivoted link to pivot, relieving pressure on said switching element, causing power to be shut off from said band saw.

* * * * *